(12) United States Patent
Kosanovic

(10) Patent No.: US 7,096,471 B2
(45) Date of Patent: Aug. 22, 2006

(54) APPARATUS FOR RESOURCE MANAGEMENT IN A REAL-TIME EMBEDDED SYSTEM

(75) Inventor: Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 687 days.

(21) Appl. No.: 09/871,776

(22) Filed: Jun. 1, 2001

(65) Prior Publication Data

US 2003/0028582 A1 Feb. 6, 2003

(51) Int. Cl.
*G06F 9/46* (2006.01)

(52) U.S. Cl. .................. 718/104; 718/102; 718/103
(58) Field of Classification Search ......... 718/100–108
See application file for complete search history.

(56) References Cited

U.S. PATENT DOCUMENTS 4,056,846 A * 11/1977 Callahan et al. ............ 718/105
6,301,603 B1 * 10/2001 Maher et al. ............... 718/105
6,370,560 B1 * 4/2002 Robertazzi et al. ......... 718/105

* cited by examiner

*Primary Examiner*—Meng-Al T. An
*Assistant Examiner*—Kenneth Tang
(74) *Attorney, Agent, or Firm*—Abdul Zindani; Wade James Brady, III; Frederick J. Telecky, Jr.

(57) ABSTRACT

An apparatus is disclosed for allocating processing resources, such as instruction execution which can be measured in MIPs or memory capacity, or other resources of a processor itself or resources used in the process of performing operations, such as memory resources, busses, drivers and the like, to functions in a queue waiting to be executed. This apparatus includes a capacity determining device for determining an amount of the processor resource available to be assigned, a load determining device for determining an estimate of an amount of the resource needed for each function waiting in the queue to execute, a prioritization device for prioritizing each of the functions in the queue waiting to be executed, and an allocating device, which receives information from the capacity determining device, the load determining device, and the prioritization device, for allocating the available resource to the functions based on a hierarchical priority scheme.

5 Claims, 2 Drawing Sheets

| | $a_{JK}$ | $a_{JK}$ | $a_{JK}$ | $a_{JK}$ | $a_{JK}$ | $a_{JK}$ | $a_{JK}$ |
|---|---|---|---|---|---|---|---|
| 30 INSTANCE 1  34—$f_1$ | 1—43 | 0 | 0 | 1 | 1—51 | 0 | 0 |
| 35—$f_2$ | 1—44 | 0 | 0 | 0 | 1—52 | 0 | 0 |
| 31 INSTANCE 2  $f_1$ | 1 | 1—45 | 0 | 0 | 1 | 1—53 | 0 |
| $f_2$ | 0 | 1—46 | 0 | 0 | 0 | 1—54 | 0 |
| 34—$f_1$ INSTANCE 3 | 0 | 1 | 1—47 | 0 | 0 | 1 | 1—55 |
| 35—$f_2$  32 | 0 | 0 | 1—48 | 0 | 0 | 0 | 1—56 |
| $f_1$ INSTANCE 4 | 0 | 0 | 1 | 1—49 | 0 | 0 | 1 |
| $f_2$  33 | 0 | 0 | 0 | 1—50 | 0 | 0 | 0 |
| TIME PERIOD | 36 $t_0$ | 37 $t_1$ | 38 $t_2$ | 39 $t_3$ | 40 $t_4$ | 41 $t_5$ | 42 $t_6$ |

APPARATUS FOR RESOURCE MANAGEMENT IN A REAL-TIME EMBEDDED SYSTEM

CROSS-REFERENCE TO RELATED APPLICATIONS

Not applicable.

STATEMENT REGARDING FEDERAL SPONSORED RESEARCH OR DEVELOMENT

Not applicable.

FIELD OF THE INVENTION

The present invention relates to the allocation and usage of processor resources in the performance of processing tasks that have time-varying changes in resource requirements. More specifically, the present invention concerns monitoring the processor resources and determining or estimating the current needs for these resources so that they may be allocated by the processor in an optimally efficient way, no matter what kind of event may happen in the future.

BACKGROUND OF THE INVENTION

A software developer has a limited number of resources to allocate to a processor for use in performing one or more executable functions. These resources may include the memory, processing speed, millions of instructions per second (MIPS), processing time, etc., that can be allocated to one or more functions or multiple states of a function. Because of the limited processor resources, a programmer must attempt to write programming that most efficiently utilizes the resources of the processor.

Another concern for the programmer is the dynamically varying usage of the resources over time. In a real-time embedded system, the signal input characteristics determine which functions will run. Therefore, resource consumption depends on the signal input. Also, adaptive algorithms change the mode of task execution in accordance with the signal environment and the achieved performance, thereby changing the amount of resource consumption. Unfortunately, programmers do not have the benefit of real-time information indicating the dynamic usage of processor resources, when designing and implementing a program function. For example, determining the dynamic utilization of the MIPS resource by a previously known method requires that the software function toggle an output pin of the processor each time the function begins and finishes.

Existing methods for minimizing a processor's performance degradation include time slicing and background processing. For example, when the available memory capacity of a digital signal processor (DSP) is nearly used up or overloaded, processing operations become prioritized. Prioritizing the operations allows those having a high priority to be performed in the foreground and lower priority operations performed in the background. Channels are allocated MIPS for calculations whether the channel uses the MIPS or not.

SUMMARY OF THE INVENTION

The invention relates to a resource management agent (Agent) used to manage resources in a processor. This Agent serves to monitor, determine, and control resource consumption. Real-time resource management within a processor allows far more tasks to be performed in a particular time period. For example, such resource management used with a communication processor may increase the number of communication channels that may be supported simultaneously by a digital signal processor.

The resource management Agent controls the allocation of processing resources assigned to discrete parts of a decomposed algorithm, when these parts are capable of being managed (i.e., turned on and off) by the Agent. In other words, the Agent dynamically reassigns processing resources so that they are efficiently used to satisfy the time-varying requirements of the decomposed algorithm parts. Resources are assigned to parts of the algorithm as they are needed. The amount of resource used by a part of the algorithm is estimated by the Agent, based on the current mode of execution.

A preferred embodiment of the above-described invention relates to an apparatus for allocating a resource of a processor to functions in a queue waiting to be executed. This apparatus includes: (1) a capacity determining device for determining an amount of the processor resource available to be assigned, (2) a load determining device for determining an estimate of an amount of the resource needed for each function waiting in the queue to execute, (3) a prioritization device for prioritizing each of the functions in the queue waiting to be executed, and (4) an allocating device, which receives information from the capacity determining device, the load determining device, and the prioritization device, for allocating the available resource to the functions based on a hierarchical priority scheme.

To control peak MIPS consumption, the Agent stores an estimate of peak MIPS usage by specific software functions locally and updates the estimate whenever the state of the function changes. The estimates are subsequently used in a queuing scheme to determine how many and which of the executing software instances may enable the functions available to them, without exceeding a maximum resource threshold. When an algorithm is broken into separate parts and the parts are manageable such that they can be turned on and off, the Agent controls the way processing resources are used by the algorithm. Processor resources are applied where they are needed and are most effectively used.

Prior to managing processing resources, the agent determines the resource usage of each part of an algorithm. Based on internal information passed from the algorithm to the Agent, external resource allocation limits of the software and processor design, environmental conditions, and achieved performance, the Agent distributes processing resources to the parts of an algorithm that have the greatest need while taking resources from parts that can operate with less resource allocation or no allocation at all. As opposed to allocating a certain amount of resources to certain tasks, the Agent is dynamic and can reallocate processing resources to parts of algorithms as they need more processing power and reduce the allocation when the processing can be reduced.

The Agent has alarms set at high and low resource usage thresholds. When the processor's resource is running low or completely allocated and another part of the algorithm requires the resource, the Agent analyzes the subroutines within the algorithm and the input channels to prioritize the allocation of the resource among the competing algorithm parts, based on the environmental conditions and achieved performance. Lower prioritized resource allocations are redirected to the parts of the algorithm that have greater priority. Even if all channels of a processor require a large allocation of the resource simultaneously, the Agent limits the consumption of the resource through graceful degradation of performance. The degradation does not cause the processor to lose information or cause the processor to crash. Some compromise in software performance may occur to the user but is corrected as the Agent frees and reallocates the resource on a dynamic basis.

The Agent is similar to a flow control. It directs more resource to modules and channels that have the most instant resource needs while removing the resource from those modules that have an over-allocation of the resource. The Agent can dynamically update scheduling priorities based on various performance measures for the algorithms it controls. The Agent uses both internal and external controls. Each module contains an estimate of its resource needs and supports the ability to have its resource consumption reduced by the processor. The external controls slow down all processing or perform performance-degrading reallocation of resources when a greater amount of the resource is needed by an algorithm than is available at that time.

BRIEF DESCRIPTION OF THE DRAWINGS

Preferred embodiments of the invention are discussed hereinafter in reference to the drawings, in which.

DETAILED DESCRIPTION OF PREFERRED EMBODIMENTS

Figures 2, 3:
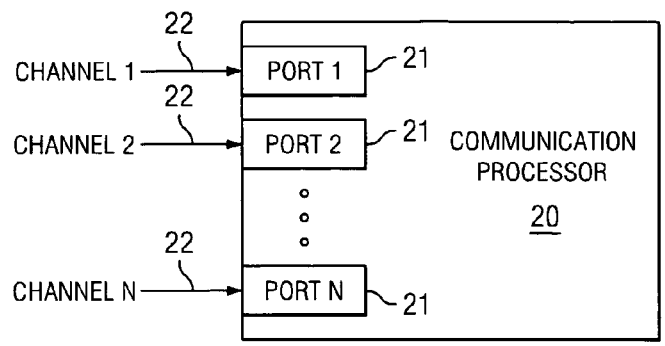
FIG. 2—illustrates a communication processor interfaced with a plurality of communication channels through its communication ports.
FIG. 3—illustrates a representative round robin allocation of a resource to the functions of four concurrently executing instances.

Referring now to FIG. 2, a communication processor 20 is interfaced with a plurality of communication channels 22 through its communication ports 21. Each of the communication channels 22 is capable of conveying an analog signal between the communication processor 20 and a channel terminating device. Upon receipt of an analog signal, the communication processor 20 creates a digital representation of the analog signal using numerous digital signal processing functions. Each channel port 21 is continuously monitored by the communication processor 20 to determine when a channel link has been established or extinguished on the communication channels 22. While a channel link exists, the communication processor 20 assigns its resources to functions that digitize and improve the digital representation of the analog signal. The assigned resources may be MIPS, memory, and other resources of the communication processor 20.

Figure 1:
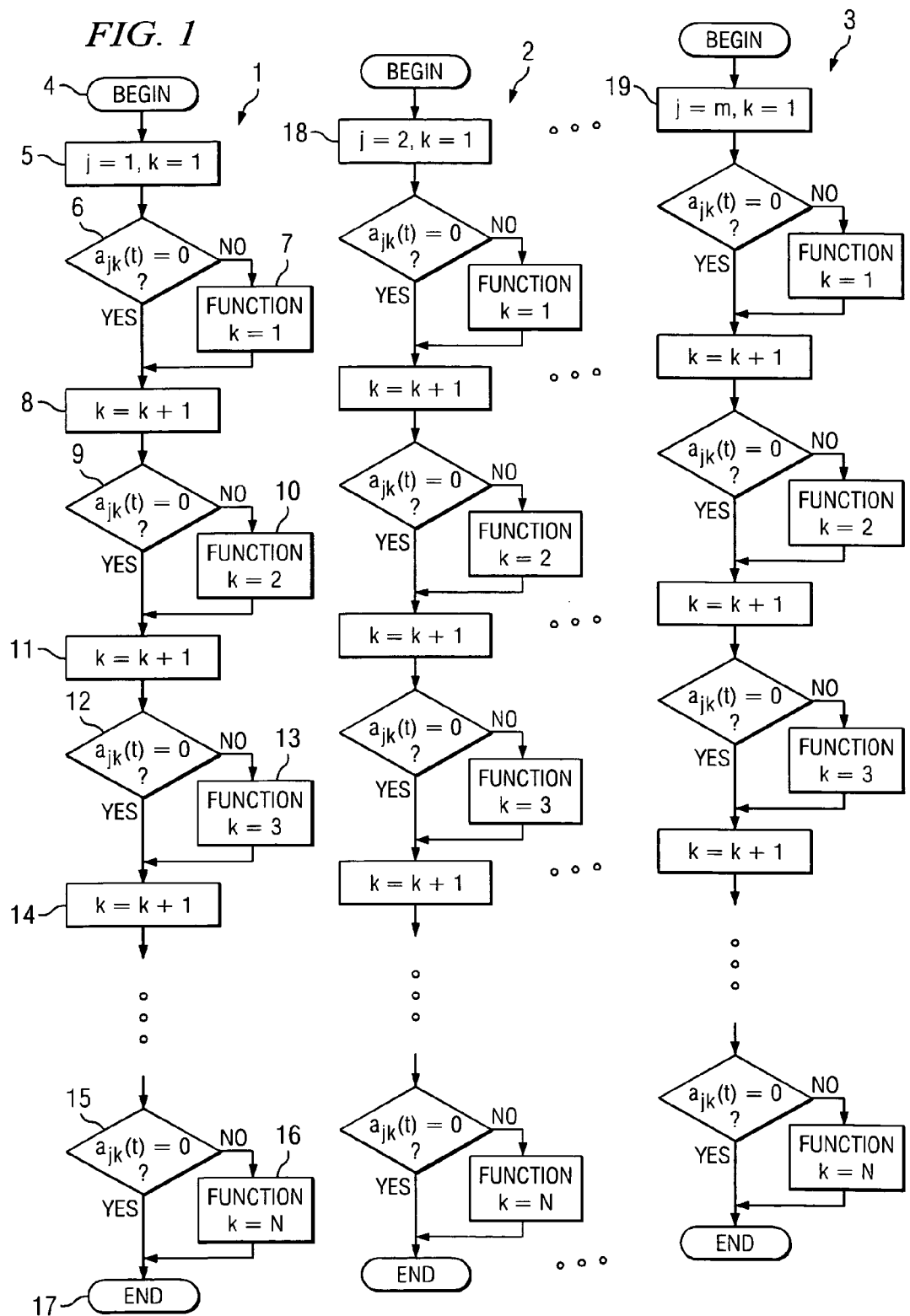
FIG. 1—illustrates a set of software processes operating for the corresponding set of active instances.

Referring now to FIG. 1, a software process 1–3 is executed by the communication processor 20 for each instance of a channel link. The instance is created when the link is established and extinguished when the link terminates. FIG. 1 illustrates a set of software processes 1–3 operating for the corresponding set of active instances identified by the instance index pointer j. The instances illustrated are those identified by the instance index values of j={1, 2, ..., m}.

Each software process 1–3 operates in the same manner. Therefore, for simplicity, the invention will be described in reference to only one instance of the software process and this description will apply equally well to every other instance of the software process. Moreover, each software process 1–3 completes its execution within a period of time t. Though the software process 1 is completed in the time period t, it is serially repeated for each incremental period of time that the instance remains active. The time period t is minimally bounded the amount of time required to completely execute any one of the processing functions operating on the channel link instance. It may be a uniform or varying period, but is assumed to be a uniform period for the purpose of describing the invention. The processing functions are discrete parts of a decomposed algorithm that may be executed independently of other parts of the algorithm.

After the software process 1 begins, as indicated by reference numeral 4, two index pointers, j and k, are initialized 5. The instance index pointer j is set to point to the next unused instance value available in the instance index. A function index pointer k is initialized to point to the first value in the index of processing functions that may be executed by the software process in connection with the channel link instance. For the first instance of a channel link, the instance index pointer j is given a value of 1, as indicated by reference numeral 5. Similarly, the instance index pointer j is given a value of 2, as indicated by reference numeral 18, for the second instance of a channel link and a value of m for the $m^{th}$ instance, as indicated by reference numeral 19.

For each time period t, the communication processor 20 determines the number of instances in existence. The processor 20 makes a determination of the amount of resources that each instance needs to execute the functions that are appropriately performed on the instance in its present state. If adequate resources are available to perform the appropriate functions on every existing instance, then these resources are distributed accordingly. However, if inadequate resources are available, then the communication processor 20 must prioritize the allocation of resources to the pending functions of each instance, based on the environmental conditions and achieved performance. The allocation is implemented such that some functions of an instance may be executed and others may not. Those that are executed receive processor 20 resources for their execution. Each of the functions within the process may be assigned a separate priority within the hierarchical priority scheme. Similarly, each instance of each function may be assigned a separate priority within the hierarchical priority scheme, based on the environmental conditions and achieved performance.

The amount of a resource allocated by the processor 20 to execute the pending functions of an instance, for the current time period, may be expressed by the equation:

$$R_j = m_0 + \sum_{k=1}^{N} a_{jk} \times f_k(\text{environmental inputs}_j, \text{ achieved performance}_j)$$

where, $R_j$=the amount of a resource allocated to the $j^{th}$ instance;

N=the number of pending functions for the $j^{th}$ instance;

$m_0$=the amount of a resource required to execute the background processing of the $j^{th}$ instance, excluding the resource allocated to the pending functions of the $j^{th}$ instance;

$f_k$ (environmental-inputs$_j$, achieved-performance$_j$)=the amount of a resource required to execute the $k^{th}$ pending function, based upon the current state of the environmental inputs and the achieved performance of the $j^{th}$ instance;

$a_{jk}$=0, if no resource is to be allocated to the $k^{th}$ pending function of the $j^{th}$ instance; and $a_{jk}$=1, if resource is to be allocated to the $k^{th}$ pending function of the $j^{th}$ instance.

The amount of resource required by the $k^{th}$ function, $f_k$, in the $j^{th}$ instance is variable and depends upon the state conditions of the $j^{th}$ channel link. The state conditions vary in accordance with the environmental inputs of the channel link and its achieved performance, during the current time period t. Priorities are assigned to the pending functions based on the environmental inputs of the channels, the achieved performance of the channels, and the amount of resources recently consumed by the active channel instances. The assignment of priorities to the k pending functions of the j instances may be expressed by the equations:

$$p_{jk} = g_k(\text{environmental inputs}_j, \text{achieved performance}_j, \text{recently consumed resource}_j)$$

where $0 \leq p_{jk} \leq 1$; and, $p_{jk}$=the priority assigned to the $k^{th}$ function of the $j^{th}$ instance; and $g_k$=is a function that assigns a priority to the $k^{th}$ function of the $j^{th}$ instance based on the environmental inputs of the $j^{th}$ channel instance, achieved performance of the $j^{th}$ channel instance, and the amount of resource recently consumed by the $j^{th}$ instance.

To achieve the prioritized implementation of a set of functions, $f_k$, in the $j^{th}$ instance, the communication processor 20 assigns a binary value of either zero or one to the $a_{jk}$ of each $k^{th}$ pending function of the $j^{th}$ instance. Reference numeral 6 identifies the point in the process flow 1 where the value assigned to the $a_{jk}$ associated with the first pending function of the $j^{th}$ instance is evaluated to determine whether this function will be executed in the current time period. If the value of $a_{jk}$ is zero, the function will not be executed in the current time period t and the process flow 1 will continue with the next step of the process, identified by reference numeral 8. If the value of $a_{jk}$ is one, then the first function will be executed in the current time period, as indicated by reference numeral 7 and the process flow 1 will continue with the step identified by reference numeral 8.

Next, the function index pointer is incremented by a value of one to point to the next function in the index, as indicated by reference numeral 8. Again, the process flow 1 evaluates the value assigned to $a_{jk}$ for the $k^{th}$ pending function of the $j^{th}$ instance, as indicated by reference numeral 9. In this case, if the value of $a_{jk}$ associated with the second pending function of the first instance is one, the second function for this instance will be executed in the current time period, as indicated by reference numeral 10. If the value of $a_{jk}$ is zero in this instance, then the second function will not be executed in the current time period and the process flow continues at the step identified by reference numeral 11. Similarly, the process flow continues at the step identified by reference numeral 11 after the second function is executed.

Reference numerals 11–13 identify the steps of the process flow 1 where the function index pointer is incremented, the value assigned to $a_{jk}$ for the third pending function of the $j^{th}$ instance is evaluated, and this third function is executed in the current time period, if the value of $a_{jk}$ is one for the indexed values of j and k. This process of incrementing k, evaluating $a_{jk}$, and executing the $k^{th}$ function of the $j^{th}$ instance, for the indexed values, is repeated until it has been applied to all of the N functions of the $j^{th}$ instance, as indicated by reference numerals 14–16. Thereafter, the process flow 1 for the $j^{th}$ instance, of the current time period, is terminated, as indicated by reference numeral 17.

Referring now to FIG. 3, imagine, for the purpose of describing the invention, that a separate communication link is received on each of four communication ports 21 of the processor 20. Each communication link creates a separate instance for the processor 20 to execute for every period t throughout the duration of the communication link. These instances are identified as instance one 30, instance two 31, instance three 32, and instance four 33. Each instance 30–34 has two functions, $f_1$ 34 and $f_2$ 35, that may be applied to its respective communication link. The horizontal axis of FIG. 3 has been sub-divided into 7 distinct time periods $t_0$–$t_6$ 36–42, respectively. For each time period, the processor 20 assigns a value of zero or one to the $a_{jk}$ associated with the functions of each instance.

For the purpose of describing FIG. 3, assume that each function uses a fixed amount of a particular resource and the resource of concern is the millions of instructions per second (MIPS) that a function needs to execute in an instance. Further assume that the communication processor 20 has a maximum of 100 MIPS to allocate, all of the processor MIPS may be allocated to the processing functions $f_1$ and $f_2$, and the functions require the following numbers of MIPS: $f_1$=25 MIPS and $f_2$=50 MIPS. Though all four instances of the communication links need to be acted upon by the processing functions, there are insufficient MIPS for the functions $f_1$ 34 and $f_2$ 35 to execute on each instance 30–33, in a single time period. Therefore, a round-robin scheme may be used to apply the two functions 34 and 35 to each of the instances 30–33 equivalently. In the case of a round-robin scheme, all of the priorities $p_{jk}$ for the pending functions are equal and remain fixed.

In general, the number instances to which a function may be applied is given by the equation:

$$\sum_{j=1}^{C} a_{jk} = C_{0k} \leq C$$

where:

C is the number of instances (i.e., communication links); and $C_{0k}$ is the maximum number of instances to which the $k_{th}$ function may be applied, during a single time period t, and identifies the maximum number of slots for the $k_{th}$ function.

Referring again to FIG. 3, $a_{11}$, $a_{12}$, and $a_{21}$ have been assigned a value of one by the processor 20 and all other $a_{jk}$ for the first time period, $t_0$ 36, have assigned a value of zero. Since each instance of function $f_1$ 34 consumes 25 MIPS and each instance of function $f_2$ 35 consumes 50 MIPS, the 100 MIPS available to the processor 20 have been allocated. In the illustrated case, the maximum number of slots, $C_{0k}$, available to function $f_1$ 34 is one and the number available to function $f_2$ 35 is two, for each time period t.

No further prioritization of the functions $f_1$ 34 and $f_2$ 35, within the four instances, is provided in the example of FIG. 3. The processor 20 simply provides the MIPS resources to each instance in a round-robin fashion over multiple time periods t. This may be seen by the diagonal movement of the values assigned to the $a_{jk}$ as time progresses from $t_0$ to $t_6$. Notice the value assigned to the $a_{jk}$ for both functions of the first instance, in time period $t_0$, moves progressively to the $a_{jk}$ of the two functions assigned to the other instances with each incremental time period. The value of $a_{jk}$ in the tabular cell position identified by reference numeral 43, in period $t_0$, moves through the matrix of $a_{jk}$ in the manner tabulated in Table 1.

TABLE 1

| Item | Period | $a_{jk}$ | Referenced Cell |
|---|---|---|---|
| 1 | $t_0$ | $a_{11}$ | 43 |
| 2 | $t_1$ | $a_{21}$ | 45 |
| 3 | $t_2$ | $a_{31}$ | 47 |
| 4 | $t_3$ | $a_{41}$ | 49 |
| 5 | $t_4$ | $a_{11}$ | 51 |
| 6 | $t_5$ | $a_{21}$ | 53 |
| 7 | $t_6$ | $a_{31}$ | 55 |

Similarly, the value of $a_{jk}$ in the tabular cell position identified by reference numeral 44, in period $t_0$, moves through the matrix of $a_{jk}$ in the manner tabulated in Table 2.

TABLE 2

| Item | Period | $a_{jk}$ | Referenced Cell |
|---|---|---|---|
| 1 | $t_0$ | $a_{12}$ | 44 |
| 2 | $t_1$ | $a_{22}$ | 46 |
| 3 | $t_2$ | $a_{32}$ | 48 |
| 4 | $t_3$ | $a_{42}$ | 50 |
| 5 | $t_4$ | $a_{12}$ | 52 |
| 6 | $t_5$ | $a_{22}$ | 54 |
| 7 | $t_6$ | $a_{32}$ | 56 |

Although the estimated amount of a resource needed to execute a function may be known a priori, the actual amount of the resource needed for a particular application of the function to an instance amount may not be known. Recall that the amount of a resource required to execute the $k^{th}$ pending function is variable and is based upon the current state of the inputs and performance of the $j^{th}$ instance.

When estimating the amount of resource needed for the function to execute, the processor 20 bases the estimate on the maximum amount of the resource that the function can use. Often, the function uses less than the maximum amount of the resource that it is capable of consuming. To optimize the efficient use of the resource, the processor 20 will attempt to over-allocate the resource based upon the maximum consumption rate. The processor 20 then monitors the actual consumption of the resource by the function. If, collectively, the executing functions consume an amount of the resource exceeding a high threshold value, then processor 20 begins to reduce the amount of the resource allocated. On the other hand, if the executing functions collectively consume less of the resource than the value indicated by a low threshold, the processor 20 attempts to maximize the allocation of the resource. Another way of describing this feature is in terms of a consumption alarm. If the actual consumption of the resource exceeds the high threshold value, then consumption alarm is set and the allocation of the resource is reduced. If the actual consumption of the resource falls below the low threshold value, an existing alarm condition is removed and the processor allocates resources normally.

There are two ways of reducing the amount of the resource allocated. First, the processor can reduce the number of instances during which a particular sub-set of the functions execute. Essentially, this is accomplished by reducing the queue sizes of the executing functions. The queue size identifies the number of instances of a function that may execute concurrently. A queue size may be varied between a minimum size of one and the maximum number of instances that exist. Second, the processor 20 can reduce the amount of the resource allocated to a sub-set of the executing functions. In this second way, the processor 20 reduces (i.e., throttles) the amount of the resource that an executing function may consume.

As mentioned before, the resources controlled by the processor 20 may be MIPS, memory, and other resources of the communication processor 20. Continuing with the example where the resource is the processor MIPS, a way of regulating the allocation of MIPS in response to their actual consumption is described. For some period of time, $\tau$, a measurement is made of the processor's 20 idle durations. These idle durations are summed to generate the total idle time, $t_{idle}$, for the period $\tau$. The amount of MIPS actually used by the processor 20 during this period may be derived using the equation:

$$\text{Total Number of } MIPS \text{ Used} = \left(1 - \frac{t_{idle}}{\tau}\right) \times \text{Total Processor } MIPS$$

where, total processor MIPS=the maximum number of MIPS that is achievable by the processor.

Once the processor determines the MIPS actually consumed by the totality of executing functions, it may compare this amount to the high and low threshold values. If the measured value exceeds the high threshold value, the processor 20 instructs the Agent to reduces the allocation of MIPS over all active instances and functions that are considered for execution. If the measured value is less than the low threshold, then the processor 20 attempts to increase the allocation of MIPS. The process of measuring the actual MIPS, comparing the measured value to threshold values, and adjusting the allocation of MIPS as necessary is performed serially in time period and may be performed periodically or intermittently. Allocation of the available MIPS to the functions waiting in the queue may be conducted to optimize the number of MIPS assigned to these functions, to optimize the number of instances of the functions concurrently being executed, or according to some other scheme.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

What is claimed is:

1. An apparatus for allocating processing resources of a signal processor to signal processing functions, which are associated with inputted signals, comprising:

a capacity determining means for determining an amount of the processor resources available to be assigned to the signal processing functions;

a load determining means for determining an estimate of an amount of the processing resources needed for each of the signal processing functions waiting in a queue to be executed;

an allocating means, which receives information from said capacity determining means and said load determining means, for allocating the available processing resources to signal processing functions waiting in the queue to be executed, based on a hierarchical priority scheme, wherein said load determining means calculates a product, for each of j instances, corresponding to each of said inputted signals, where j=1 to m, and for each of k signal processing functions associated with each of said j instances, where k=1 to N, obtained by:
- (a) estimating an amount of processing resource needed to support the execution of the $j^{th}$ instance of the $k^{th}$ signal processing function;
- (b) assigning a value of either zero or one to a multiplicand associated with the $j^{th}$ instance of the $k^{th}$ signal processing function; and
- (c) multiplying the estimated amount of processing resource needed to support the execution of the $j^{th}$ instance of the $k^{th}$ signal processing function by its associated multiplicand and assigning the result to the product associated with the $j^{th}$ instance of the $k^{th}$ signal processing function; and said load determining means calculates a sub-total sum, for each of the j instances, obtained by:
- (d) summing together the products associated with each of the k signal processing functions associated with each of the j instances; and
- (e) adding another estimated amount of the processing resource needed to support background processing associated with each of the j instances to the sum of products of each of the k signal processing functions associated with each of the j instances and assigning the result to the sub-total for each of the j instances.

2. The apparatus of claim 1, wherein:
the multiplicand value associated with the $j^{th}$ instance of the $k^{th}$ signal processing function is determined according to a hierarchical priority scheme.

3. The apparatus of claim 1, wherein:
said load determining means repeats the steps (a) through (e), recited in claim 1, for each of a number of sequential time periods; and
said allocating means reallocates the available processing resources to the signal processing functions in each of said time periods based on a hierarchical priority scheme.

4. The apparatus of claim 3, wherein:
said load determining means establishes a variable length time period that is no longer than a period needed to execute any one of the j instances and its associated k signal processing functions that are executing concurrently.

5. The apparatus of claim 3, further comprising:
for each of the j instances occurring over multiple time periods and its associated $k^{th}$ signal processing function, said prioritization means assigns increasingly higher priority in accordance with an increasingly greater number of time periods that have passed since the last $j^{th}$ instance of the $k^{th}$ signal processing function was last executed.

* * * * *